(12) United States Patent
Pollklas et al.

(10) Patent No.: US 7,533,516 B2
(45) Date of Patent: May 19, 2009

(54) AGRICULTURAL HARVESTING MACHINE CHOPPER DRUM SHARPENING DEVICE

(75) Inventors: Manfred Pollklas, Rheda-Wiedenbrueck (DE); Hans Rauch, Bad Saulgau (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 11/754,393

(22) Filed: May 29, 2007

(65) Prior Publication Data

US 2007/0271893 A1 Nov. 29, 2007

(30) Foreign Application Priority Data

May 29, 2006 (DE) ........................ 10 2006 025 224

(51) Int. Cl.
*A01D 75/08* (2006.01)
(52) U.S. Cl. ........................................................ 56/250
(58) Field of Classification Search ................. 56/12.1, 56/500, 250, 251; 241/101.2, 37, 101.77, 241/222, 101.761, 137, 153, 170, 172, 173, 241/184, DIG. 14; 451/421, 419, 420, 439, 451/5, 10
See application file for complete search history.

(56) References Cited

U.S. PATENT DOCUMENTS

| | | | | |
|---|---|---|---|---|
| 3,867,808 A | * | 2/1975 | Kidd | 56/14.1 |
| 4,321,773 A | * | 3/1982 | Fleming | 451/421 |
| 4,495,734 A | * | 1/1985 | Rauch | 451/421 |
| 4,503,643 A | * | 3/1985 | Johnson et al. | 451/420 |
| 4,799,625 A | * | 1/1989 | Weaver et al. | 241/30 |
| 4,834,303 A | * | 5/1989 | McClure et al. | 241/101.2 |
| 4,843,767 A | * | 7/1989 | Johnson | 451/420 |
| 4,934,612 A | * | 6/1990 | Johnson | 241/37 |
| 5,098,027 A | * | 3/1992 | McClure et al. | 241/101.2 |
| 5,743,073 A | * | 4/1998 | Paquet | 56/12.1 |
| 5,911,375 A | * | 6/1999 | Isfort | 241/241 |
| 6,468,132 B2 | * | 10/2002 | Wolf et al. | 451/10 |
| 6,475,063 B2 | * | 11/2002 | Wolf | 451/5 |
| 6,503,135 B2 | * | 1/2003 | Clauss et al. | 451/419 |
| 6,931,828 B2 | * | 8/2005 | Kormann | 56/250 |
| 7,024,924 B2 | * | 4/2006 | Heinrich et al. | 73/104 |
| 7,222,804 B2 | * | 5/2007 | Wolf et al. | 241/30 |
| 2003/0159419 A1 | * | 8/2003 | Kempf | 56/16.4 A |
| 2004/0168528 A1 | * | 9/2004 | Heinrich et al. | 73/865.9 |
| 2004/0182061 A1 | * | 9/2004 | Pirro et al. | 56/16.4 R |
| 2005/0124263 A1 | | 6/2005 | Clauss | |

FOREIGN PATENT DOCUMENTS

| | | |
|---|---|---|
| DE | 41 28 483 | 3/1993 |
| DE | 199 03 153 | 3/2000 |
| DE | 103 57 177 | 7/2005 |

* cited by examiner

*Primary Examiner*—Árpád Fábián-Kovács
(74) *Attorney, Agent, or Firm*—Michael J. Striker

(57) ABSTRACT

An agricultural harvesting machine, in particular a self-propelled forage harvester, has a chopper drum that includes chopping blades, a sharpening device that is assigned to the chopper drum and is drivable via a drive for sharpening the chopping blades, wherein the sharpening procedure for sharpening the chopper drum is activated when the agricultural harvesting machine is in a non-working mode.

12 Claims, 2 Drawing Sheets

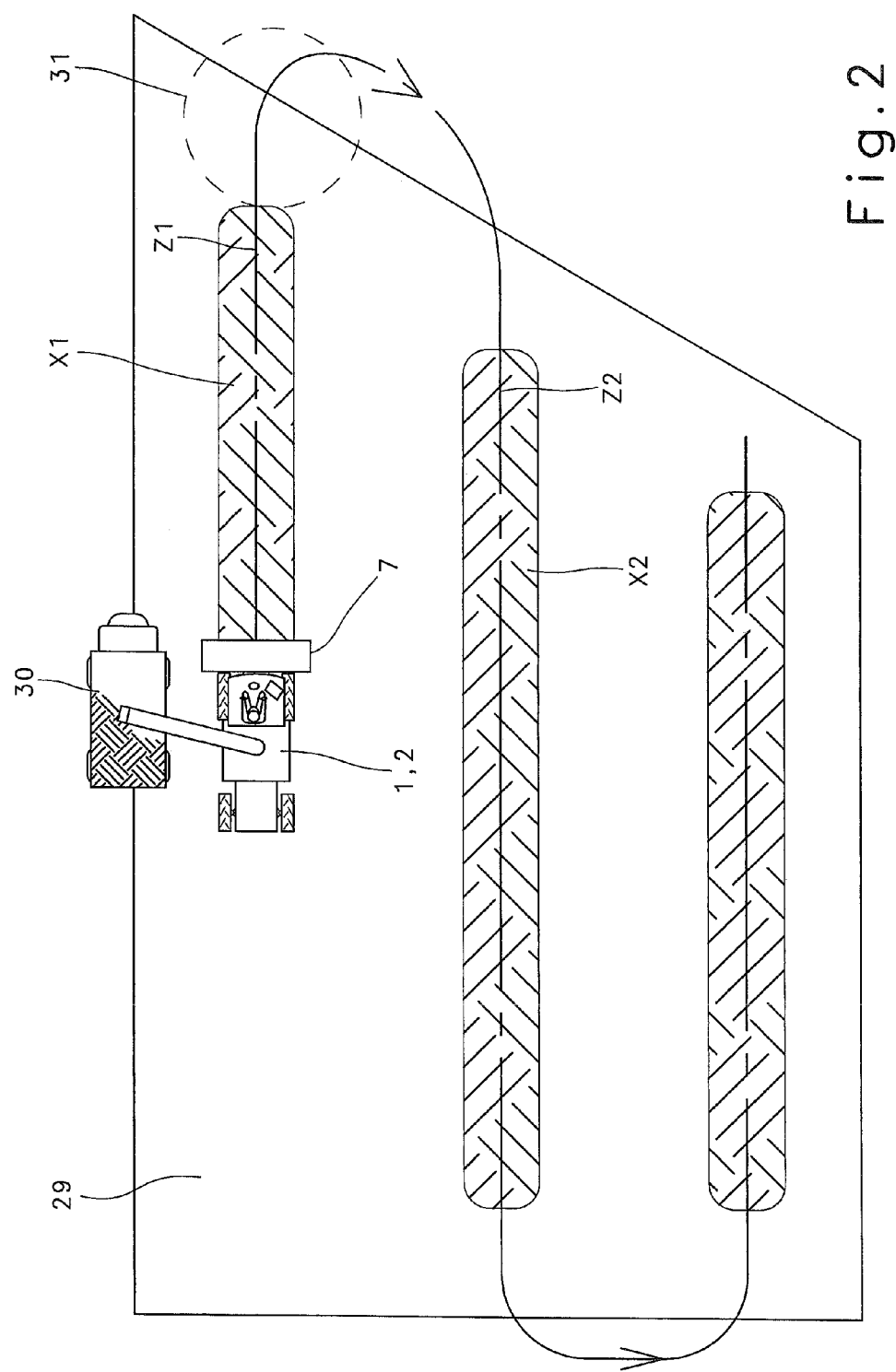

AGRICULTURAL HARVESTING MACHINE CHOPPER DRUM SHARPENING DEVICE

CROSS-REFERENCE TO A RELATED APPLICATION

The invention described and claimed hereinbelow is also described in German Patent Application DE 10 2006 025 224.1 filed on May 29, 2006. This German Patent Application, whose subject matter is incorporated here by reference, provides the basis for a claim of priority of invention under 35 U.S.C. 119(a)-(d).

BACKGROUND OF THE INVENTION

The present invention relates to an agricultural harvesting machine, particularly a self-propelled forage harvester, with a chopper drum that includes a chopping blade, and a sharpening device—with a sharpening tool for sharpening the chopping blade—assigned to the chopper drum.

The blades mounted on the chopper drum become worn during the working process of the forage harvester the longer they are in service. The intensity of the wear depends, e.g., on the crop material parameters and the contamination level of the crop material. The required sharpening of the blades is carried out once a specified level of wear has been attained using sharpening devices known in the related art and which can be operated and controlled manually or fully automatically.

Publication DE 199 03 153 C provides that the sharpening intervals be regulated depending on the state of wear of individual chopping blades, that the state of wear be detected by measuring the load on the shear bar against the direction of flow of the crop material and transversely to the direction of flow of the crop material. If the state of wear detected indicates that the blades are dull, the operator is notified accordingly and/or the crop material flow is stopped automatically, or the shear bar is adjusted, or a sharpening procedure is initiated.

Publication DE 103 57 177 A1 discloses a sharpening device for a chopping device of a forage harvester, with which the sharpening intervals for sharpening the chopping blades are determined depending on the operating period of the chopping blades.

The disadvantage of all of the previous designs is that they do not ensure that the working mode of the forage harvester engaged in the harvesting process is interrupted in order to sharpen the blades. Under certain conditions, an interruption of this type can result in a great deal of harvesting time being lost, while also requiring additional effort from the operator of the forage harvester, who is already required to control and activate many other functions during the harvesting process.

SUMMARY OF THE INVENTION

The object of the present invention, therefore, is to avoid the disadvantages of the cited related art and to make it possible to carry out the harvesting operation with the fewest possible interruptions, while also relieving duties of the operator of the agricultural harvesting machine.

In keeping with these objects and with others which will become apparent hereinafter, one feature of the present invention resides, briefly stated, in an agricultural harvesting machine, comprising a chopper drum that includes chopping blades; a sharpening device that is assigned to said chopper drum and is drivable via a drive for sharpening said chopping blades; and means for activating a sharpening procedure for sharpening said chopper drum when the agricultural harvesting machine in a non-working mode during a harvesting process.

Given that the sharpening procedure for sharpening the chopping blades is activated when the agricultural harvesting machine is in a non-working mode during the harvesting process, this period of time that is available anyway during the harvesting operation can be used, advantageously, to carry out the sharpening procedure for the chopping blades, thereby ensuring that the harvesting process does not have to be interrupted in order to sharpen the chopping blades.

In an advantageous refinement of the present invention, the non-working mode is defined as the travel across the headland and/or end of the field; this period of time during which the harvesting machine is not working—which necessarily reoccurs—can be used to carry out the sharpening procedure to sharpen the chopping blades, thereby resulting in an efficient use of the harvesting machine during the harvesting process.

It proves particularly practical to integrate this procedure in an existing headland management system. The headland management system then automatically activates the sharpening procedure while the harvesting machine travels across the headland and/or the end of the field. Not only is the period of time during non-operation of the harvesting machine used to sharpen the chopping blades, the driver is also relieved of duties.

In an advantageous refinement of the present invention, a control device is provided to control the drive of the sharpening device; the control device controls—preferably automatically—the drive of the sharpening device depending on a non-working mode signal or a working mode signal. Advantageously, the process of sharpening the chopping blades can therefore be automated in the harvesting process as a whole.

Given that the non-working mode signal and/or the working mode signal is registered or specified automatically, it can be advantageously prevented that the operator of the agricultural harvesting machine will forget to activate the drive of the sharpening device in order to sharpen the chopping blades. The operator always has the option to activate the drive of the sharpening procedure himself, in order to adapt the activation of the sharpening procedure to different harvesting conditions and/or to the wear on the chopping blades.

In an advantageous embodiment of the present invention, the control device can be operated in a help mode and a main mode. In the help mode, the sharpening device is moved into a specifiable home position and is fixed in position using the drive. In the main mode, the position of the sharpening device is controlled and/or regulated using the drive in a manner such that a sharpening procedure is carried out.

Given that, when a non-working mode signal has been emitted, the control device is operated in the main mode, e.g., during shunting or a pause in operation, it is advantageously ensured that the working operation of the agricultural harvesting machine need not be interrupted in order to sharpen the chopping blades. In contrast, when a working mode signal has been emitted, the control device is operated in the help mode, thereby ensuring uninterrupted working operation of the agricultural harvesting machine.

To ensure that, in street traffic, no other participants, including the operator of the agricultural harvesting machine himself, are imposed upon or distracted by the sharpening procedure—which could result in accidents—the control device cannot be operated in the main mode when the agricultural harvesting machine is in street traffic.

Given that the sequence of steps in the main mode and/or the help mode of the control device is predetermined or is freely programmable, an inexperienced operator is relieved of duties and operational mistakes are prevented; it is also ensured that an experienced operator can adapt the processes to the existing harvesting conditions at any particular point in time.

In an advantageous embodiment of the present invention, a sensor connected with the control device is located on the harvesting machine, and the sensor is suitable for detecting whether the agricultural harvesting machine is in a working mode or a non-working mode during the harvesting process, and it is suitable for generating a related working mode signal or non-working mode signal, thereby always ensuring that the sharpening process can be automated during the harvesting process. The sensor is preferably a camera or a laser scanner, thereby making it possible to determine in advance when the agricultural harvesting machine is in the working mode or the non-working mode.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2: shows a self-propelled forage harvester in the harvesting process during travel across a headland, in a top view.

DESCRIPTION OF THE PREFERRED EMBODIMENTS

Figure 1:
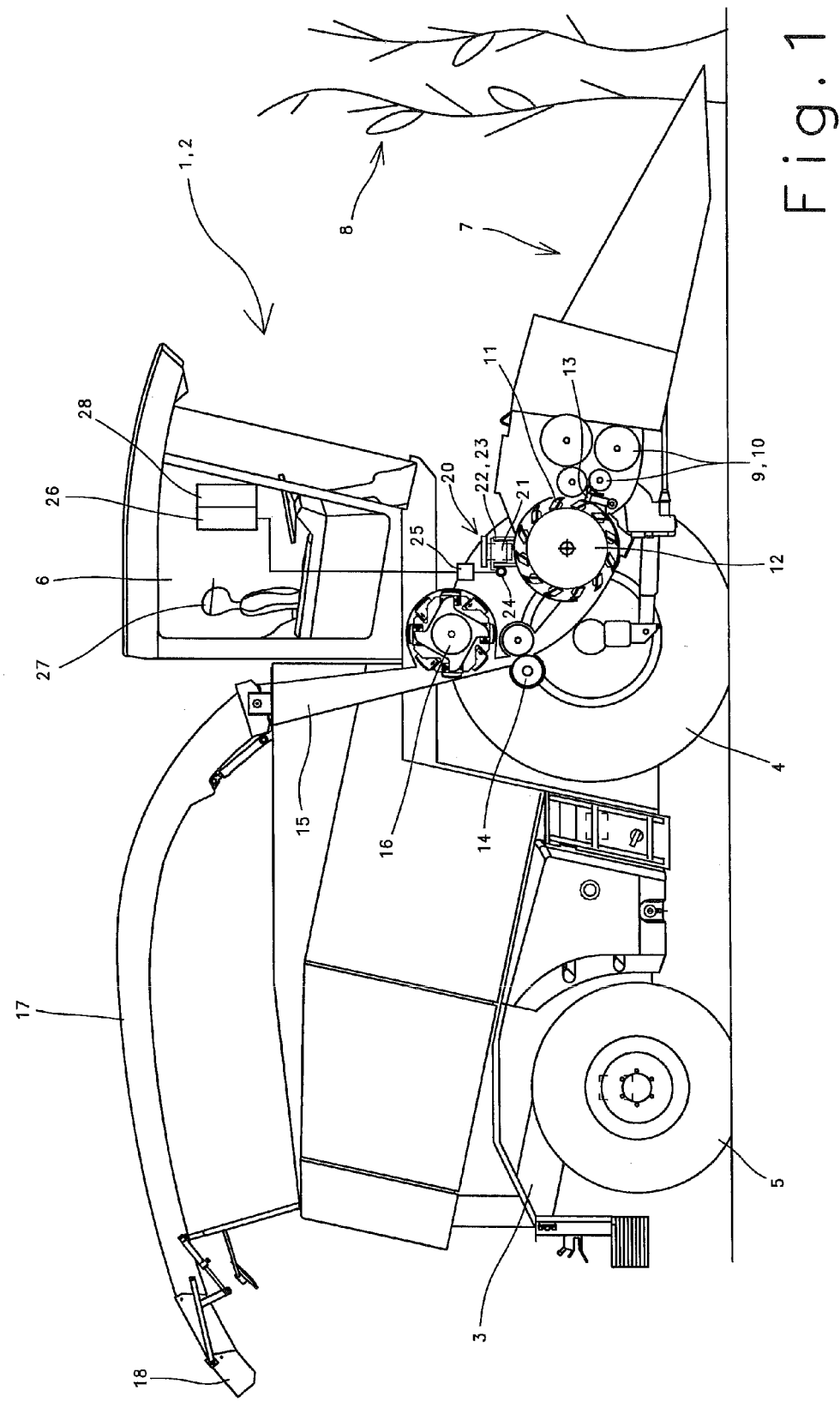
FIG. 1: shows a self-propelled forage harvester with a front attachment and a sharpening device, in a sectional side view.

FIG. 1 shows a sectional side view of an agricultural harvesting machine 2 designed as a self-propelled forage harvester 1. It is built on a frame 3 that is carried by front and rear wheels 4, 5. Forage harvester 1 is operated from driver's cab 6, from which it is possible to see front attachment 7 attached to the front of forage harvester 1. In the working mode of forage harvester 1, front attachment 7 picks up crop material 8, cuts it and delivers it to downstream intake and compression rollers 9, 10. Intake and compression rollers 9 guide crop material 8 to downstream, rotating chopper drum 12 with blades 11 mounted on it which fragmentize crop material 8 on a shear bar 13.

Fragmentized crop material 8 is subsequently transferred to a post-fragmentation device 14 which pounds the crop grains, e.g., corn, and transfers them via a conveyor chute 15 to a post-accelerator 16. Post-accelerator 16 accelerates fragmentized crop material 8 and conveys it—via a horizontally and vertically displaceable upper discharge chute 17 and an upper discharge chute flap 18 assigned thereto such that it can swivel, in order to regulate the ejection distance of the crop material stream toward a hauling device assigned to upper discharge chute 17.

To ensure that blades 11 of chopper drum 12 can be sharpened after a definable operating period without having to remove individual blades 11 or entire chopper drum 12, a sharpening device 20 known per se is provided above chopper drum 12; sharpening device 20 essentially includes a sharpening stone 21, a sharpening stone holder 22 assigned thereto, and a carrying axle 23 on which the sharpening device is displaceably mounted, and it includes a drive 24 known per se for operating sharpening device 20. A control device 25 is assigned to drive 24 of sharpening device 20 in order to control it. A sharpening procedure can take place as described in DE 41 28 483 C2. Control device 25 can be operated in a help mode or a main mode. In the help mode, sharpening device 20 is moved into its starting position and is fixed in position. In the main mode, sharpening device 20 is operated in order to sharpen chopping blades 11.

According to the present invention, the sharpening procedure is activated in order to sharpen chopping blades 11 when agricultural harvesting machine 2 is in a non-working mode during the harvesting process. The non-working mode is defined, in particular, as agricultural harvesting machine 2 traveling across the headland and/or end of the field. The sharpening procedure can also be integrated in an existing headland management system known per se, and it can be activated by such. The first time a headland sector is reached, all data and/or working steps are registered, in the "learning mode", by operator 27 of agricultural working machine 2 using operating device 26, and they are stored in fieldwork computer 28 provided therefore. In particular, the data on the driving path, i.e., the path that has been traveled, steering actuation, the driving style, i.e., the speed driven, changes in speed, reduction in speed, the rotational speed of the chopper drum, and the position of the front attachment are stored and evaluated.

For purposes of optimization and control, a second or further turnaround procedures are also preferably stored and evaluated in the same manner. This optimized turnaround procedure can then be repeated automatically as many times as desired when the headland management system is activated, using a not-shown switch provided therefore. Using operating device 26, operator 27 can intervene manually in the automated turnaround procedure if unforeseeable disruptions occur.

FIG. 2 shows a forage harvester 1 that includes a not-shown headland management system, next to a hauling vehicle 30 in the harvesting process as it picks up crop material swath X1 lying on field 29 and approaches the end of a field-crossing path Z1, turns around, and re-enters field 29 at the start of a new field-crossing path Z2, in order to pick up crop material swath X2. For example, after the data registered in advance by the headland management system are stored and evaluated, the following automatic turnaround procedure of forage harvester 1 in headland sector 31—which includes the sharpening procedure for sharpening blades 11—could be programmed in fieldwork computer 28. Front attachment 7 is raised when headland sector 31 is reached. The rotational speed of chopper drum 12 is reduced. When the rotational speed of the chopper drum required for the sharpening procedure is reached, the headland management system automatically activates the main mode of control device 25.

Control device 25 causes drive 24 of sharpening device 20 to displace sharpening stone holder 22 out of the resting or park position—in which it is located next to chopper drum 12, at the side—across the width of chopper drum 12. The underside of sharpening stone 21 is in contact with blades 11 and sharpens them. In the sharpening procedure, sharpening stone 21 is moved numerous times across the width of chopper drum 12. The duration of the sharpening procedure can be varied. After the sharpening process is carried out, sharpening stone 21 is moved into its park position. Control is carried out in a manner such that—at the latest, with a certain amount of lead time before the rotational speed of the chopper drum is increased—control device 25 is operated in the help mode, thereby ensuring that sharpening device 20 is moved into its resting or park position and is fixed in position before the rotational speed of the chopper drum is increased. In addition, the steering system is controlled automatically, in order to exit field-crossing path X1 and drive off of field 29 and turn around, in order to enter field 29 once more via field-crossing path X2.

After the turnaround is complete, the operations are carried out in nearly reverse sequence. When forage harvester 1 has reached the beginning of field-crossing path X2, front attachment 7 is located in the working mode position so it can pick up crop material swath X2. The same procedure or a modified procedure can be carried out the next time the headland is traveled across. It is feasible for the sharpening procedure to not be activated automatically by the headland management system every time the headland is traveled across, but rather for the sharpening cycles to be specified by operator 27.

In addition to the incorporation of the sharpening process in an existing headland management system described above, it is possible for control device 25 to control drive 24 of sharpening device 20 depending on a non-working mode signal or a working mode signal. The non-working mode signal can be registered or specified automatically. To this end, a not-shown sensor is assigned to agricultural harvesting machine 2. The sensor is suitable for determining whether agricultural harvesting machine 2 is in the working mode or non-working mode, and it is suitable for generating a related signal. Suitable scanners can include one or more cameras or laser scanners placed at suitable points in harvesting machine 2.

The signal generated by the sensor can be transmitted to control device 25 using suitable lines. Depending on the signals generated, control device 25 is operated in the help mode or main mode. In the help mode, sharpening device 20 is moved into a specifiable home position and is fixed in position using the drive. In the main mode, the position of sharpening device 20 is controlled and/or regulated using drive 24 in a manner such that a sharpening procedure is carried out. According to the present invention, control device 25 is operated in the main mode when a non-working mode signal has been emitted, e.g., during shunting operation or during a pause.

When a working mode signal has been emitted, control device 25 is operated in the help mode, so that the sharpening device is moved into its park position and is locked in position, thereby ensuring uninterrupted working operation of agricultural harvesting machine 2 during the harvesting process. As a result, the periods in which agricultural harvesting machine 2 is in the non-working mode, which result anyway during the harvesting process, can be used to sharpen chopping blades 11, thereby ensuring that the harvesting process does not have to be interrupted in order to sharpen chopping blades 11, and ensuring that sharpened blades 11 are always available.

To ensure that, in street traffic, no other participants, including operator 27 of the agricultural harvesting machine 2 himself, are imposed upon or distracted by the sharpening procedure—which could result in accidents—control device 25 cannot be operated in the main mode—and, therefore, the sharpening procedure cannot be carried out—when agricultural harvesting machine 2 is in street traffic. The position of agricultural harvesting machine 2 is preferably determined using a not-shown GPS system in a manner known per se.

It will be understood that each of the elements described above, or two or more together, may also find a useful application in other types of constructions differing from the type described above.

While the invention has been illustrated and described as embodied in an agricultural harvesting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. An agricultural harvesting machine, comprising:
   a chopper drum that includes chopping blades;
   a sharpening device that is assigned to said chopper drum and is drivable via a drive for sharpening said chopping blades;
   means adapted for activating a sharpening procedure for sharpening said chopping blades, after detecting a need for sharpening, when the agricultural harvesting machine is in a non-working mode during a harvesting process, said harvesting process comprising a working mode wherein crops are harvested, and a non-working mode wherein crops are not being harvested as the agricultural harvesting machine travels across a region selected from a group consisting of a headland and an end of a field; and
   an electronic headland management system, wherein said means adapted for activating are integrated in said electronic headland management system.

2. An agricultural harvesting machine as defined in claim 1; and further comprising a control device for controlling said drive of said sharpening device, said control device being configured to control said drive of said sharpening device depending on a signal consisting of a non-working mode signal and a working mode signal.

3. An agricultural harvesting machine as defined in claim 2, wherein said control device processes the non-working mode signal or the working mode signal in a way selected from the group consisting of registered, specified automatically and both.

4. An agricultural harvesting machine as defined in claim 2, wherein said control device is configured so that it is operated in a mode selected from the group consisting of a help mode and a main mode, so that in the help mode said sharpening device is moved into a specifiable home position and is fixed in a position using said drive, and in said main mode a position of said sharpening device is effected using the drive being effected in a manner selected from the group consisting being controlled, being regulated, and both.

5. An agricultural harvesting machine as defined in claim 4, wherein said control device is configured so that it is operated in said main mode when the non-working mode signal has been emitted.

6. An agricultural harvesting machine as defined in claim 5, wherein said control device is configured so that it is operated in said main mode when the non-working mode signal has been emitted during a period selected from the group consisting of shunting and a pause in operation.

7. An agricultural harvesting machine as defined in claim 4, wherein said control device is configured so that it is operated in the help mode when the working mode signal has been emitted.

8. An agricultural harvesting machine as defined in claim 4, wherein said control device can not be operated in the main mode when the agricultural working machine in street traffic.

9. An agricultural harvesting machine as defined in claim 2, wherein the control device is configured so that a sequence of steps in a mode selected from the group consisting of a main mode, a help mode, and both of said control device is provided in a way selected from the group consisting of being predetermined and being freely programmable by an operator.

10. An agricultural harvesting machine as defined in claim 2; and further comprising a sensor connected with said control device and located on the agricultural harvesting machine, said sensor being swivelable for detecting whether the agricultural working machine is in a working mode or a non-working mode during the harvesting process and, based thereon, generating the signal.

11. An agricultural harvesting machine as defined in claim 10, wherein said sensor is designed as an element selected from the group consisting of a camera, a laser scanner, and both.

12. An agricultural harvesting machine as defined in claim 1, wherein the agricultural harvesting machine is configured as a self-propelled forage harvester.

* * * * *